Figure 1A:
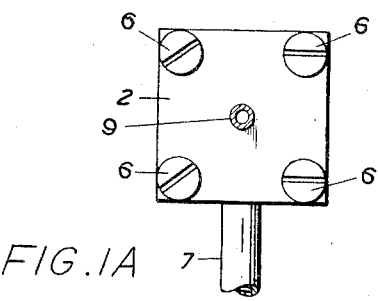

Sept. 25, 1956  H. R. RONNEBECK  2,764,017
APPARATUS FOR DETERMINING THE VAPOUR
PRESSURE OF VOLATILE LIQUIDS
Filed March 16, 1954  5 Sheets-Sheet 1

Inventor:
Heinrich Richard Ronnebeck,
By Cushman, Darby & Cushman
Attorneys.

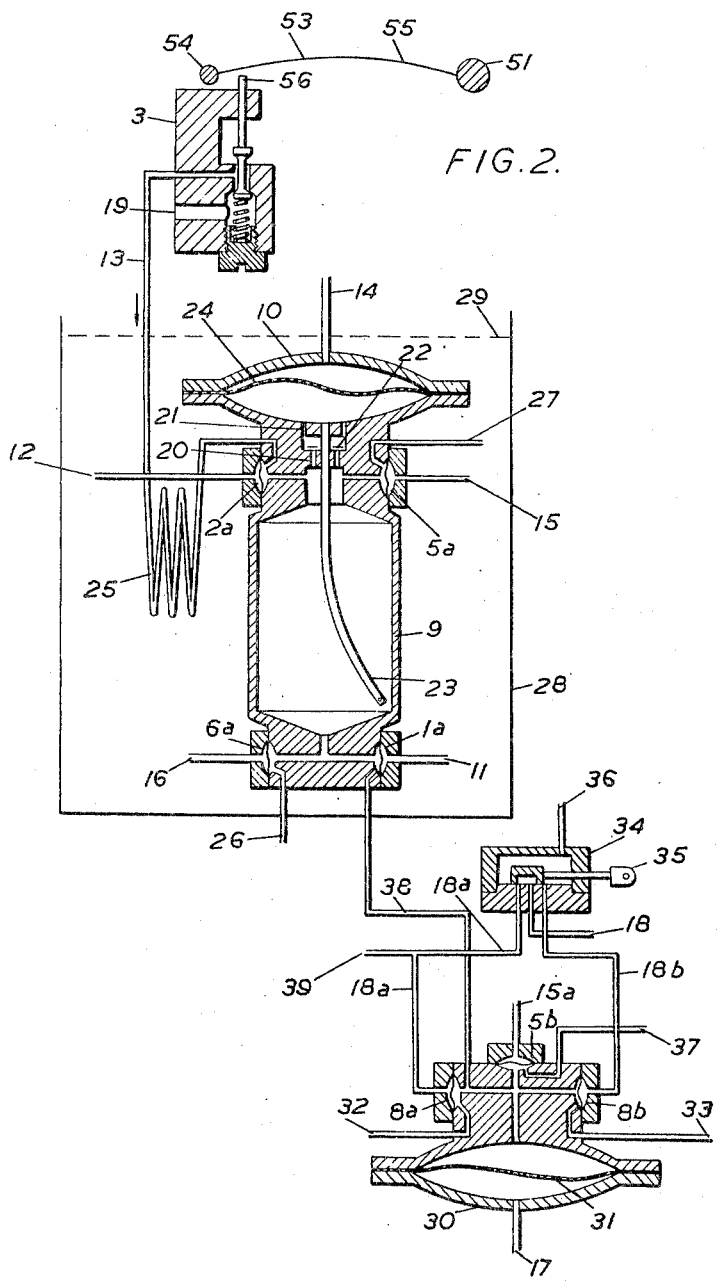

Sept. 25, 1956  H. R. RONNEBECK  2,764,017
APPARATUS FOR DETERMINING THE VAPOUR
PRESSURE OF VOLATILE LIQUIDS
Filed March 16, 1954 5 Sheets-Sheet 3

Inventor:

Heinrich Richard Ronnebeck,
By
Cushman, Darby & Cushman
Attorneys.

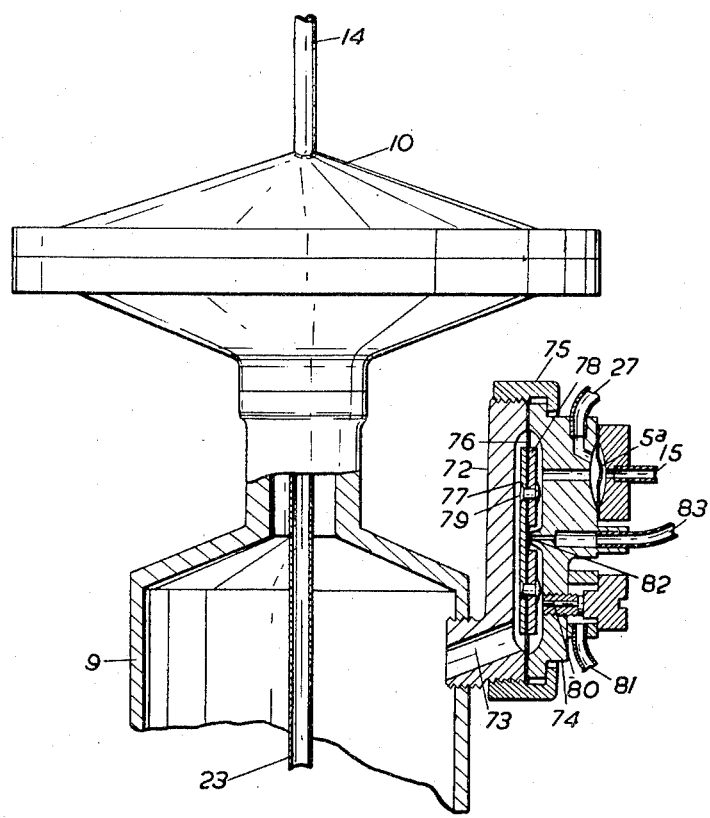

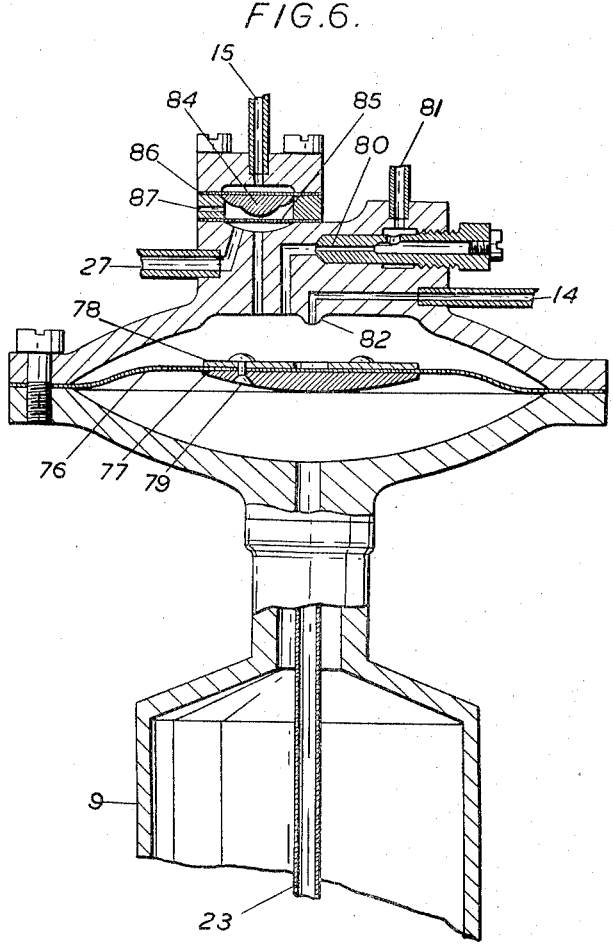

2,764,017
Patented Sept. 25, 1956

2,764,017

APPARATUS FOR DETERMINING THE VAPOUR PRESSURE OF VOLATILE LIQUIDS

Heinrich Richard Ronnebeck, Norton-on-Tees, England, assignor to Imperial Chemical Industries Limited, a corporation of Great Britain Application March 16, 1954, Serial No. 416,678

Claims priority, application Great Britain March 30, 1953

11 Claims. (Cl. 73—53)

This invention relates to apparatus for determining the vapour pressure of volatile liquids and more particularly to apparatus for automatically determining and recording such vapour pressures.

An example of the application of the determining of the vapour pressure of volatile liquids in industry is in petroleum refining where the so-styled "Reid" vapour pressure is used as a measure of the volatility of a petrol and has been adopted in Great Britain, the United States of America and Germany as a test for the suitability of different blends for specific purposes. The determining of the vapour pressure of samples by the "Reid" apparatus is a manual operation involving considerable time and on that account is not very satisfactory when it is desired to test samples at frequent intervals.

In contradistinction to this method, the apparatus of the present invention is particularly suitable for automatically determining and recording the vapour pressure of volatile liquids, in particular of petrol, at frequent intervals, for example every half-hour.

According to the present invention there is provided apparatus for automatically taking, at predetermined intervals, samples of volatile liquid and recording its vapour pressure at a desired temperature, said apparatus comprising in combination a closed vessel, means for taking the desired quantity of liquid from a supply or supplies and transferring it to the closed vessel; means for agitating the liquid in the vessel to ensure maximum vaporisation thereof; means for heating the vessel and its contents to, and for maintaining them at a substantially constant temperature; means for transmitting the vapour pressure to a pressure recorder of conventional type; means for rejecting the vapour and excess liquid after the vapour pressure has been recorded, for purging the vessel and for providing, if desired, for the presence therein of an atmosphere of indifferent gas before the taking of the next sample of volatile liquid; the said means for taking the desired quantity of liquid and transferring it to the vessel; the said means for agitating the liquid in the vessel; the said means for transmitting the vapour pressure to the recorder, the said means for rejecting the vapour and excess liquid, and for purging the vessel being controlled by suitably disposed valves and/or other devices which are caused to operate, at predetermined intervals, by a timing mechanism.

The closed vessel may be of any convenient size and shape with branches and/or connections for passing the liquid into it, for transmitting the vapour pressure to the recorder and for rejecting the vapour and excess liquid after the vapour pressure has been recorded.

It will be understood that the quantity of liquid passed into the closed vessel should be such as to ensure the production of a saturated vapour therein at the temperature at which it is desired to record the vapour pressure.

The means for taking the desired quantity of liquid from a supply and transferring it to the closed vessel may, for example, be in the form of a force pump suitably connected through suction and delivery valves to the supply and to the closed vessel respectively, the chamber of the pump being of the required volume and the rod of the plunger being arranged to be operated either by fluid pressure acting upon a ram attached to it or by co-operation with a suitably disposed solenoid, so that during the outward stroke the desired quantity of liquid is drawn from the supply into the pump chamber and on the inward stroke the liquid is transferred to the closed vessel. It is preferred however, in order to avoid the leakages that occur in such force pumps, to use a diaphragm-type pump which comprises two concave parts placed together to enclose a lens-shaped space and having a slack flexible diaphragm clamped between them, the net volume of the lens-shaped space when the diaphragm is pressed against the concave face of one part being such as to give the desired quantity of liquid. One of said parts is provided with suitable connections to the supply and to the closed vessel through valves of the preferred type hereinafter described. The other part is arranged so that pressure may be applied to the diaphragm by fluid or by solenoid-operated plunger to transfer the liquid to the closed vessel. If desired, by the provision of further valves, it may be arranged to take samples of liquid from different supplies in succession.

The means for agitating the liquid in the closed vessel may comprise any suitable device for repeatedly and vigorously bubbling through the liquid, over a period of time, vapour of the liquid and/or an indifferent gas, for example, air. The means may conveniently comprise a force pump but it is preferred to use a diaphragm-type pump which is arranged integrally with the closed vessel and has a non-return suction valve and an open discharge port to which is attached a tube extending into the spaced occupied by the liquid in the vessel. Alternate release and application of pressure on the diaphragm of the pump will draw some of the vapour of the liquid and/or indifferent gas in the closed vessel into the pump and then bubble it through the liquid.

Various means for heating the vessel and its contents to, and for maintaining them at, a substantially constant temperature, will present themselves, but it has been found particularly convenient for this purpose to submerge the closed vessel in a water-bath which is provided with an electric immersion heater and a thermostat. It is desirable for the temperature of the water-bath to be controlled within 0.1° C. and it is therefore preferred to employ a mains-operated electronic thermostat of known type for the purpose. Since the vapours dealt with are in general inflammable it has been found desirable to enclose the electronic thermostat in a flame-proof case. It has also been found desirable to arrange for the water in the bath to be continuously kept in motion, for example by a suitable stirrer which may be driven by a pneumatic or an electric motor.

Although the means for transmitting the vapour pressure to a recorder of conventional type may be a simple tube, this is undesirable for several reasons, for example it would be necessary to maintain the tube between the closed vessel and the recorder at the desired temperature in order to obtain the correct reading and to prevent condensation of the vapour, and, in addition, it would be difficult to purge the tube of the vapour. It is therefore preferred to use a pressure transmitter which comprises a flexible diaphragm arranged within a suitable housing so that there is a free space each side of the diaphragm, one of which spaces is in communication with the closed vessel and the other in communication with the recorder preferably by way of a valve of the preferred type hereinafter described. This latter space on the recorder side of the diaphragm is also connected by way of a throttling capillary to a suitable supply of compressed air and to atmosphere through a small bore discharge nozzle, for example 1/32 inch bore, which is arranged to be closed by the diaphragm when the latter approaches the nozzle. In operation the diaphragm takes up such a position that the pressures on each side are balanced as any out-of-balance pressure will cause the diaphragm to close or open the small bore discharge nozzle until the pressure drop through the nozzle is such as to restore balance. When compressed air is used in operating the diaphragm-type pump for agitating the liquid in the closed vessel, it has been found convenient to use this pump as a combined agitator and pressure transmitter by arranging it to have a small bore discharge nozzle as above described for a pressure transmitter, said nozzle communicating with the atmosphere through the valve which controls the application of pressure to the diaphragm when agitating the liquid. It will be understood that in this case the diaphragm-type pump is also connected, on the recorder side, with a suitable compressed air supply through a throttling capillary and is provided with a valve for isolating the recorder during agitation of the liquid in the closed vessel.

The means for ejecting the vapour and excess liquid from the closed vessel after the vapour pressure has been recorded may conveniently comprise suitably disposed valves, preferably of the type hereinafter described, through at least one of which an indifferent gas, for example air, is passed under pressure into the vessel, so that the vapour and excess liquid are purged from the vessel through at least one other of the valves. Such purging may be continued as desired to ensure complete rejection of vapour, and the indifferent gas remaining in the closed vessel conveniently provides that required when desired in the agitation of the next sample of liquid.

The suitably disposed valves, before-mentioned, may be any type of valve which can be operated pneumatically, hydraulically or electrically. For example the valves may be slide valves of "D" or piston type, the rod of each being arranged to operate either by fluid pressure acting upon a ram attached thereto or by co-operation with a suitably disposed solenoid. It has however been found preferable, particularly as in general they are small, to use valves comprising a body of two portions between which is clamped a flexible diaphragm. Each of the two body portions is arranged with a spherical dishing internally, that is to say juxtaposed to the diaphragm, and one portion is suitably drilled to provide an inlet port and an outlet port. The other portion is drilled so that pressure may be applied to the diaphragm by fluid or solenoid-operated plunger to press the diaphragm into the spherical dishing of the first-mentioned portion and thus close the inlet and outlet ports. It will be understood that the form of the devices for connecting and/or disconnecting the operating medium to and/or from the appropriate valves or pumps will depend on the nature of the operating medium. When electric power is used they will be suitable switches and when fluid pressure is used they will be suitable pilot or relay valves.

The timing mechanism by which the suitably disposed valves and/or other devices controlling the above-mentioned means are caused to operate may conveniently comprise a camshaft which is driven through suitable gears from a second or power shaft parallel to the camshaft, the second shaft being driven, if necessary through gearing, by electric or other motor. On the second or power shaft are mounted by eccentric sheaves a number of thrust forks, the direction of thrust of each thrust fork being governed by a rocker arm rotatably mounted on a fixed shaft, the rocker arm in turn co-operating with a cam on the camshaft. Each thrust fork is arranged so that, when its governing rocker arm has been brought to the required position by the co-operating cam, it will, on its outward stroke, make contact with and turn a double arm which is rotatably mounted on a second fixed shaft. Each double arm is provided with a bar which in turn actuates the device by which the operating medium, for example electric power or fluid pressure, is connected to and/or disconnected from the desired valve, force pump or diaphragm pump; the turning of the said double arm in one direction bringing about the connection of the operating medium to the valve or pump and the turning of it in the contrary direction causing the disconnection of the operating medium from the valve or pump.

It has been found desirable to provide for substantially instantaneous or "snap"-action of the devices for connecting and disconnecting the operating medium to and/or from the suitably disposed valves or pumps. This may be done by arranging for the bar, with which each double arm is provided, to be in the form of a flat spring hinged at both ends and compressed between the hinges so that it is constrained to the form of a slightly curved strut in such a manner that when the double arm is turned the flat spring is at first given a partial reversal of curvature and will then snap to a complete reversal of curvature and in so doing is arranged to actuate the device for connecting or disconnecting the operating medium to or from the desired valve or pump.

It will be understood that the profiles of the cams and their arrangement on the camshaft will be such as to give the correct sequence of operations.

In order to ensure that the closed vessel and its contents, after the liquid therein has been agitated, is brought to the desired temperature, it is preferred to arrange a delay period between the period of agitation of the liquid and the operation of the valves and/or device controlling the rejection of the vapour and excess liquid, such delay period including that during which the vapour pressure is recorded.

It will also be understood that it may be desirable to arrange for a further delay period, after the rejection of the vapour and excess liquid in order to complete the purging process and/or to reduce the frequency with which samples are taken. It has been found convenient to provide for such delay periods by driving the camshaft through a ratchet wheel thereon which is actuated by a pawl mounted by eccentric sheave on the second or power shaft, said pawl being slotted to receive and to slide on a rod or pin which is arranged parallel to, and rotatably mounted by, an arm riding freely on the camshaft, said rod or pin resting on the circumference of a wheel which has notches cut in said circumference and which is on an additional driven or third shaft. The said third shaft may be driven at the required speed through suitable gearing, for example pawl and ratchet, from the second or power shaft or may be driven independently. The ratchet wheel on the camshaft is arranged with deepened or dropped teeth at intervals so that when one of these comes under the pawl the above-mentioned rod or pin prevents the pawl engaging with the dropped teeth, and the rotation of the camshaft stops until the rod or pin drops into a notch in the wheel on the third shaft. The notched wheel may thus be arranged to control the desired delay periods and also, by arranging one or more deeper notches in this and one or more of the dropped teeth in the ratchet wheel on the camshaft to be deeper than others, the notched wheel may be made to ensure the correct sequence of operations by preventing the camshaft from getting out of step with said wheel, or if these are put out of step, to bring them again into step.

If the delay period after the rejection of vapour and excess liquid is sufficiently long it may be desired to make provision for advancing the mechanism by hand to the beginning of the cycle of operations, but no further, so that a vapour pressure record may be obtained without waiting for the automatic cycle to begin. This may be done by arranging a toothed wheel integral with the above mentioned notched wheel, said toothed wheel having teeth removed from the portions of its circumference which correspond to the period of the automatic cycle, and a spindle carrying a gear wheel at one end and a knob at the other, said knob being preferably outside the enclosure, of the mechanism, so that on pushing in and turning the knob the gear wheel at the other end of the spindle engages with the toothed wheel integral with the notched wheel and turns it until the gear wheel on the spindle runs free. The notched wheel has then been brought into the correct position for the beginning of the automatic cycle.

When it is desired to take samples of liquid from more than one supply, for example from two supplies alternately, this may be achieved when fluid pressure is employed as the operating medium for the suitably disposed valves, by arranging for a length of the additional driven or third shaft carrying the notched wheel to constitute the plug of a two-way cock, the cock being so connected that the device controlling the inlet valves of the means for taking the desired quantity of liquid from the supplies will effect alternate operation of said valves. It is preferred however, owing to the difficulty of preventing leakage of such a two-way cock, to use in its stead a "D" or piston type slide valve which is operated by an eccentric rod mounted on said third shaft. If electric power is to be used as the operating medium for the valves, it is clear that the above-mentioned eccentric may be used to actuate a two-way switch for the purpose of supplying the power in the correct sequence to the switch or switches which, when actuated by the associated cam or cams, will cause the operation of the appropriate valves.

It will be understood that the speed of the second or power shaft and of the additional driven or third shaft of the timing mechanism will be chosen with due regard to the desired time intervals for the operation of the individual valves and/or other devices in the correct sequence and to the intervals at which it is desired to record the vapour pressure of the liquid. For example, it has been found convenient for recording at half-hourly intervals the vapour pressure of liquid hydrocarbon mixtures from a refining process, for the second or power shaft to be driven at about 6 to 8 revolutions per minute and the additional driven or third shaft at about 1 revolution per hour.

As hereinbefore mentioned, the apparatus of the present invention is particularly suitable for the automatic recording of the so-styled "Reid" vapour pressure of petrol. The usual "Reid" apparatus for determining this pressure briefly comprises a brass bottle of 100 cubic centimetres capacity which is filled with petrol at 0° C. to 4.4° C. (32° to 40° F.) and is then screwed to another brass bottle of 400 cubic centimetres capacity which contains air at atmospheric pressure and known temperature. There is a loss of volume of 6.5 cubic centimetres when the bottles are screwed together so that the net total volume is 493.5 cubic centimetres. A pressure gauge is fitted to the 400 cubic centimetre bottle and the two connected bottles are shaken frequently while immersed in a water bath at 37.8° C. (100° F.) for twenty minutes, by which time the pressure has ceased to rise. The final pressure, corrected by a factor determined by the original temperature of the air in the 400 cubic centimetre bottle, is the "Reid" vapour pressure. This procedure is tedious and involves considerable labour when samples are to be tested every half-hour or so in order to check the quality of petrol being produced in a refining and/or blending plant. A full description of the usual apparatus, of its method of use, of the corrections to be made and of the numerous precautions to be taken, is available in "Standard Methods for Testing Petroleum and Its Products" published by the Institute of Petroleum, London.

One form of the apparatus of the present invention, for recording the vapour pressure of petrol taken alternately from two supplies at half-hourly intervals and for which the operating medium for the valves and pumps and the medium for rejecting the vapour and excess liquid, after a recording of vapour pressure has been made, is to be compressed air, is described in what follows by reference to the six figures of the accompanying drawings.

Figure 1B:
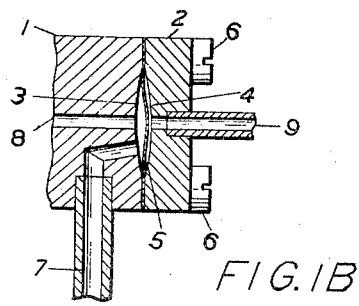
Figure 4:
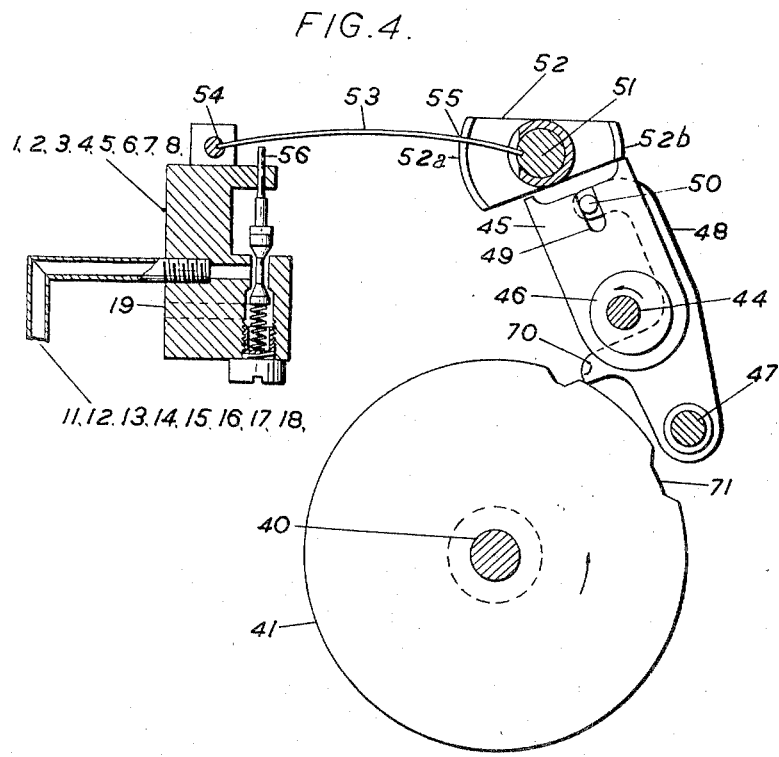
Figure 3:
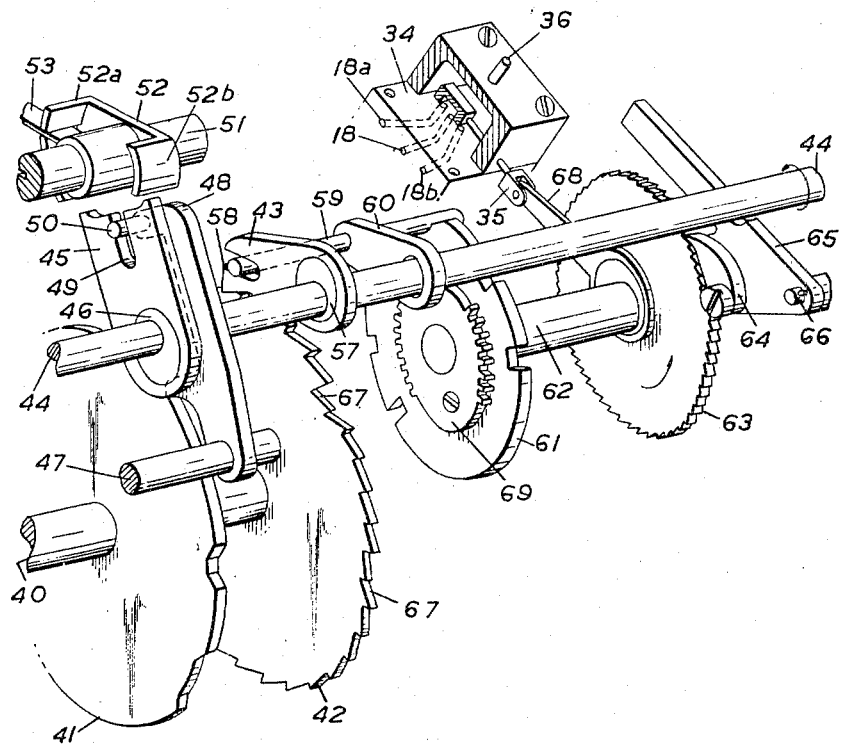

In the drawings, Figure 1A illustrates a front elevational view of the preferred form of valve for controlling the various means, Figure 1B illustrates a cross sectional view of the valves shown in Figure 1A, Figure 2 illustrates diagrammatically the arrangement of the apparatus except for the timing mechanism and the conventional pressure recorder, Figure 3 illustrates the essential parts of the timing mechanism except for the motor and gear driving the shafts and Figure 4 is a sectional-elevation through the camshaft of the timing mechanism.

Figure 5 of the accompanying drawings illustrates in cross-section a form of pressure transmitter which, as already mentioned, may be used for transmitting the vapour pressure from the closed vessel to the pressure recorder, and Figure 6 illustrates in cross-section a combined diaphragm-type pump and pressure transmitter which, as before mentioned, may conveniently be used when compressed air is to be employed for operating a diaphragm-type pump for agitating the liquid in the closed vessel.

Except for Figure 1 the numerals have the same significance throughout the drawings.

Referring to Figure 1 of the drawings, the body of the valve comprises two portions 1 and 2, each of which has a spherical internal surface 3 and 4 respectively, and between which is clamped the flexible diaphragm 5. The two portions 1 and 2 of the body are held together by the screws 6. The portion 1 of the valve body is conveniently an integral part of the closed vessel or other receptacle into or from which it is desired to pass fluid and is provided with an inlet port 7 for such fluid and an outlet port 8 which communicates with said vessel. The portion 1 of the valve body is drilled and provided with a connection 9 through which fluid pressure is applied to the diaphragm 5 for closing the inlet and outlet ports 7 and 8.

Referring to Figure 2 of the drawings, the numeral 9 indicates a closed vessel of 400 cubic centimeters volume having integral therewith a diaphragm pump 10 of 93.5 cubic centimetres volume which constitutes the means for agitating the liquid passed into the vessel and with the latter provides a combined volume of 493.5 cubic centimetres. The vessel is also provided with valves 1a, 2a, 5a and 6a, of the preferred type already described by reference to Figure 1, which are connected by pipes 11, 12, 15 and 16 respectively, to the compressed air supply through relay valves 1, 2, 5 and 6, which are not shown but are of the type illustrated in section at 3, the compressed air being connected to each relay valve at a point 19. The closed vessel 9 is also provided at 20 and 21 with ways communicating with the lower portion of the pump 10, with a disc non-return valve 22 and a dip tube 23. The pump 10 has a diaphragm 24 and the portion of the pump above this is connected to the compressed air supply by pipe 14 through a relay valve 4 of the type shown at 3. The whole vessel 9 and diaphragm pump 10 are submerged in a water bath 28, the water level being indicated by the chain-line 29. The water bath 28 is heated to and maintained at the desired temperature, in the present example 37.8° C., by a thermostatically controlled immersion heater not shown. It will be clear that when the valves 1a, 2a, 5a and 6a, are closed by application of the compressed air pressure through the relay valves 1, 2, 5 and 6, and pipes 11, 12, 15 and 16 respectively, rise of pressure in vessel 9 will cause vapour to pass through the ways 20 and 21 and will displace the diaphragm 24 of the pump 10 upwards. Application of the compressed air pressure to the diaphragm through the relay valve 4 and the pipe 14 will depress the diaphragm 24 and cause vapour to bubble through the liquid in the vessel, the non-return valve 22 preventing the vapour from passing back through the ways 21 and 20. Repetition of this action for a suitable period will ensure maximum evaporation of the liquid.

After the desired period has elapsed the vapour pressure is communicated to, and recorded by, a conventional pressure recorder by way of pipe 27 on releasing the air pressure on valve 5a by operation of the relay valve 5.

The means for ejecting vapour and excess liquid from the vessel comprises the relay valve 3, pipe 13 and coil 25, through which compressed air is passed to purge the vapour and excess liquid through the pipe 26, the inlet of the air to the vessel being controlled by the valve 2a and the rejection of vapour and excess liquid from the vessel by valve 6a. The coil 25 which is immersed in the water bath, is provided in the air pipe 13 in order to ensure that the air remaining in the vessel after the rejection of vapour and excess liquid is substantially at the desired temperature at which it is desired to record the vapour pressure of the sample next following.

The means for taking the desired quantity of petrol from the supplies comprises the diaphragm pump 30 of 100 cubic centimetres volume which has a diaphragm 31 to which pressure may be applied by the compressed air which is led thereto through a relay valve 7 (not shown) and pipe 17. The pump 30 is connected with the two supplies of petrol by pipes 32 and 33 respectively and is provided with valves 8a and 8b for controlling the admission of the liquid into the pump, compressed air being supplied to these through a relay valve 8 (not shown), pipe 18, a slide valve 34 and pipes 18a and 18b. It is clear that the position of the slide 35 of the slide valve 34 determines from which supply the desired quantity of petrol is taken. In the drawing the position of the slide is shown so that the petrol may be taken from the supply connected by pipe 32. Compressed air is supplied to the chest of slide valve 34 through the pipe 36 so that when valve 8a is to be operated valve 8b is kept closed by air pressure through pipe 18b. Similarly when the slide of the valve 34 is in position for the petrol to be taken from the supply connected by pipe 33 by the operation of valve 8b the valve 8a is kept closed by air pressure through pipe 18a. The diaphragm pump 30 is also provided with a valve 5b to which compressed air for its operation is passed through a relay valve (not shown) and pipe 15a and with a pipe 37 through which, if desired, the petrol passed into the pump may be discharged to waste instead of being transferred to the closed vessel through pipe 38. The relay valve for the operation of valve 5b may conveniently be the relay valve 5 which controls the supply of compressed air to the valve 5a for transmitting the vapour pressure to the recorder.

The pipe 39 is for use when it is desired to be able to identify the vapour pressure readings of the samples of petrol taken from the supply connected by pipe 32. This identification may conveniently be arranged by providing a second pen to the pressure recorder, the second pen being operated by a higher pressure Bourdon tube than that recording the vapour pressures and set at a zero beyond the range of the vapour pressures to be recorded, so that when air pressure is applied through relay valve 8 to close valve 8a after a sample has been taken from the supply connected by pipe 32, the second pen of the recorder chart is deflected slightly from its zero and marks the recording chart in the deflected position radially adjacent to the trace of the pen recording the vapour pressure for at least a part of the time during which the vapour pressure of the sample is being recorded.

The numerals 51, 53, 54 and 55, shown at the top of Figure 2 of the drawings indicate parts by which the spindle 56 of the relay valve 3 is operated and will be described fully by reference to Figures 3 and 4 of the drawings.

Referring to Figures 3 and 4 of the drawings, the numeral 40 denotes a camshaft on which are fixed eight cams, of which, for clarity, only one is shown as indicated by the numeral 41. The camshaft 40 is driven intermittently, in the direction indicated by the arrow in Figure 4, by the ratchet wheel 42 and the co-operating pawl 43 which is mounted eccentrically on the power shaft 44 by means of the eccentric sheave 57. The power shaft 44 is rotated, in the direction indicated by arrows, at a speed of 6.4 revolutions per minute by electric motor and gearing (not shown). Also mounted on the power shaft 44 are eight thrust forks 45 with eccentric sheaves 46. The numeral 47 indicates a fixed shaft on which are rotatably mounted eight rocker arms 48, one rocker arm being arranged to co-operate with each thrust fork 45 by means of the slot 49 in the latter and the pin 50 attached to the rocker arm. Each rocker arm 48 is shaped to be in contact at 70 with the edge of one of the cams 41 on the camshaft 40, as shown in Figure 4, so as to control the direction of thrust of the co-operating thrust fork 45. The numeral 51 indicates a second fixed shaft on which are rotatably mounted eight members 52 having arms 52a and 52b, each of the eight members 52 being arranged to co-operate with a thrust fork 45. The numerals 1, 2, 3, 4, 5, 6, 7 and 8, in Figure 4 indicate a series of relay valves, one corresponding to each cam 41 with its co-operating thrust fork 45, rocker arm 48 and double-armed member 52. Each of the eight relay valves is connected to a compressed air supply of 20 lb. per square inch pressure at parts indicated by the numeral 19 and to their corresponding valves, pumps, etc. as already described by reference to Figure 2 of the drawings, by pipes 11, 12, 13, 14, 15, 16, 17 and 18, the pipe 18 supplying air to valves 8a and 8b via the slide valve 43 and the pipes 18a and 18b as already described.

The numeral 54 denotes a rod which is fixed to the tops of the relay valves and between which are sprung the bars 53, one for each valve, the ends of each are located, but free to move through a small angle, in recesses in the bar 54 and in shaft 51. Each bar passes also through a slot in the arm 52a of the appropriate member 52 as shown in Figure 3. The bars 53 are of spring steel and are disposed over the spindle 56 of the corresponding valve so that on rotation of the member 52 pressure is applied to the point 55 to cause the bar to be given a partial reversal of curvature and then to "snap" to a complete reversal of curvature, thereby depressing or releasing the spindle 56 of the relay valve.

In Figure 4 of the drawings, the cam 41, the thrust fork 45 and the rocker arm 48, are shown in positions such that the thrust fork 45 is about to make contact with the arm 52b of the member 52. Further rotation of the power shaft 44 will cause the thrust fork 45 to rotate the member 52 in an anticlockwise direction and so apply downward pressure to the bar 53 at 55 causing it to "snap" downwards and depress the spindle 56 of the relay valve. The spindle 56 of the relay valve will remain depressed until the cam 48 has rotated sufficiently to allow the contact point 70 of the rocker arm 48 to drop into the depression 71 in the cam face. The rocker arm 48 and the thrust fork 45 then move to the left and the thrust fork at the maximum throw of its eccentric sheave 46 makes contact with the arm 52a of member 52 which is rotated clockwise thereby applying upward pressure to the bar 53 at 55 and causing it to "snap" upwards, thus releasing the spindle 56 of the relay valve. It will be understood that the profiles of the eight cams 41 and their arrangement on the camshaft are such as to give the desired sequence of operations at the required intervals.

Again, referring to Figure 3, the pawl 43 which drives the ratchet wheel 42, has an arcuate slot 58 through which passes a pin 59 which in turn is supported by a member 60 riding freely on the power shaft 44. The pin 59 also rests on the circumference of a notched wheel 61 on the shaft 62 which is driven by the ratchet wheel 63 and pawl 64.

The pawl 64 is pivoted to the lever 65 which has a fulcrum at 66. The lever 65 is actuated by a cam on a shaft of the driving gear (not shown) in such a way that the shaft 62 is rotated at the rate of one revolution per hour in the direction indicated by the arrow on ratchet wheel 63.

The ratchet wheel 42 which drives the camshaft 40 has deepened or "dropped" teeth indicated at 67 so that when one of these comes under pawl 43 the latter is prevented from engagement by the pin 59, and the rotation of the camshaft ceases until the pin 59 drops into a notch in the wheel 61. The wheel 61 thus controls the delay periods for vaporising the sample in vessel 9 and for allowing its temperature to attain a constant value. The wheel 61 also initiates the cycle of operations every half-hour by having two notches deeper than the others and the "dropped" tooth in ratchet wheel 42 for initiating the cycle is also deeper than that required for the above-mentioned delay period. In this way, the camshaft 40 cannot get out of step with the wheel 61.

readily understood that the teeth removed from the wheel 69 as described prevents the wheel 61 being advanced beyond the position for the beginning of a cycle and also prevents engagement of the gear on the inner end of the above-mentioned spindle during an automatic cycle.

The operation of the apparatus above described by reference to Figures 1, 2, 3 and 4 of the drawings is conveniently shown in the following table, which shows the sequence of operations for recording the vapour pressure of a sample of petrol taken from the supply connected to pipe 32 of Figure 2; the duration of the automatic cycle being 11¼ minutes followed by an idle period of 18¾ minutes, after which a sample is taken from the supply connected to pipe 33. The sequence of operations are then repeated as in the following table, except that "8a" is replaced by "8b" in the last column for intervals numbered 1, 2, 7 and 9.

*Table*

| Interval No. | Time, Seconds | Relay valves open to air pressure | Order of valve operation | Effect of relay valve operation |
|---|---|---|---|---|
| 0 | 0 | 1, 3, 4, 5, 7 and 8 | | Valves 2a and 6a of vessel 9 open, valves 1a and 5a closed, vessel being purged with air through pipes 13 and 26. Diaphragms of pumps 10 and 30 depressed. |
| 1 | 9⅜ | 1, 3 and 5 | 8, 4 and 7 air released | Valve 8a of pump 30 opened. Diaphragms of pumps 10 and 30 released. Pump 30 starts to fill through line 32. |
| 2 | 9⅜ | 1, 3, 4, 5, and 8 | 4 and 8 to air pressure | Diaphragm of pump 10 depressed. Pump 30 full and valve 8a closed. |
| 3 | 9⅜ | 1, 3, 7 and 8 | 7 to air pressure. 4 and 5 air released | Diaphragm of pump 10 released. Valve 5b of pump 30 open and pump drained via pipe 37. |
| 4 | 9⅜ | 1, 3, 4, 5, 7 and 8 | 4 to air pressure | Diaphragm of pump 10 depressed. |
| 5 | 9⅜ | 1, 3, 5, 7 and 8 | 5 to air pressure. 4 air released | Diaphragm of pump 10 released. Pump 30 drained with valve 5b closed. Valve 5a of vessel 9 also closed. |
| 6 | 9⅜ | 1, 2, 4, 5, 7 and 8 | 2 and 4 to air pressure. 3 air released | Diaphragm of pump 10 depressed. Valve 2a of vessel 9 is closed and purging air is cut off. |
| 7 | 9⅜ | 1, 2, 4 and 5 | 8 and 7 air released | Valve 8a of pump 30 opened and diaphragm released. Pump starts to fill. |
| 8 | 9⅜ | 1, 2, 5 and 6 | 6 to air pressure. 4 air released | Valve 6a of vessel 9 is closed. Diaphragm of pump 10 released. |
| 9 | 9⅜ | 1, 2, 5, 6 and 8 | 8 to air pressure | Pump 30 full with valve 8a closed. |
| 10 | 9⅜ | 2, 5, 6, 7 and 8 | 1 air released. 7 to air pressure | Valve 1a of vessel 9 opened and contents of pump 30 discharged into vessel 9 by pipe 38. |
| 11 | 9⅜ | 2, 5, 6, 7 and 8 | No action | Time allowed for pump 30 to be completely discharged. |
| 12 | 9⅜ | 1, 2, 5, 6, 7 and 8 | 1 to air pressure | Valve 1a of vessel 9 is closed. |
| 13 | 9⅜ | 1, 2, 4, 5, 6, 7 and 8 | 4 to air pressure | Diaphragm of pump 10 depressed to commence evaporation of liquid in vessel 9. |
| 14 to 43 | 281¼ | 1, 2, 5, 6, 7 and 8 | 4 air released and to air pressure alternately at 9⅜ seconds intervals. | Agitating liquid in vessel 9 to ensure complete evaporation. |
| 44 | 9⅜ | 1, 2, 6, 7 and 8 | 4 and 5 air released | Expansion of vapour into pump 10 to give 493.5 cc. Valve 5a of vessel 9 open for pressure transmission to recorder via pipe 27. |
| 45 to 66 | 206¼ | 1, 2, 6, 7 and 8 | No action | Delay period to allow temperature to attain constant value of 37.8° C. and for pressure to be recorded. |
| 67 | 9⅜ | 1, 3, 5, 7 and 8 | 3 and 5 to air pressure 6 and 2 air released | Valve 5a of vessel 9 closed to isolate recorder. Valve 6a opened for draining vessel 9 and valve 2a opened to purging air through pipe 13. |
| 68 | 9⅜ | 1, 3, 4, 5, 7 and 8 | 4 to air pressure | Diaphragm of pump 10 depressed to eject vapour and liquid. |
| 69 | 9⅜ | 1, 3, 5, 7 and 8 | 4 air released | To continue purging of vessel 9 and of pump 10. |
| 70 | 9⅜ | 1, 3, 4, 5, 7 and 8 | 4 to air pressure | |
| 71 | 9⅜ | 1, 3, 5, 7 and 8 | 4 air released | |
| 72 | 9⅜ | 1, 3, 4, 5, 7 and 8 | 4 to air pressure | Diaphragm of pump 10 depressed. Cycle ends with purging by air continuing. |

On shaft 62 there is also mounted an eccentric rod 68 which operates the slide valve 34 controlling the taking of samples from the two supplies as already described by reference to Figure 2 of the drawings. It will be understood that the complete timing mechanism may conveniently be enclosed with a suitable box or casing.

The numeral 69 in Figure 3 denotes a toothed-wheel which is integral with the notched-wheel 61, the wheel 69 having teeth removed from the portions of its circumference which correspond to the portions of notched wheel 61 which are operative during the automatic cycle. By means of the toothed-wheel 69 and a spindle (not shown), which is arranged to pass into the enclosure of the timing mechanism and to carry a gear wheel on its inner end and a knob on its outer end, so that on pushing the knob and turning it the gear wheel at the inner end of the spindle engages with toothed-wheel 69, the notched-wheel 61 may be brought into the correct position for initiating an automatic cycle during an otherwise idle period. It will be Referring to Figure 5 of the drawings, which is a vertical cross section, the body of the pressure transmitter comprises two recessed discs 72 and 74, of which 72 is provided with a projection having a passage 73 for connection to the closed vessel 9 already described by reference to Figure 2 of the drawings. The discs 72 and 74 are held together by the threaded ring 75 which serves also to clamp the flexible diaphragm 76 between the outer annular portions of the discs 72 and 74. The flexible diaphragm 76 is stiffened by means of two discs 77 and 78 which are secured to it by rivets 79. The recessed disc 74 of the body of the transmitter is suitably shaped and drilled with inlet and outlet ports for a valve 5a of the preferred type already described by reference to Figure 1 of the drawings. The recessed disc 74 is also provided with a very small bore throttling capillary 80 which is connected to a suitable supply of compressed air by the pipe 81. The recess of the disc 74 is made annular with a projection at its centre which is drilled to form a small bore nozzle 82, for example 1/32 inch diameter, which is open to the atmosphere by way of pipe 83. The disc 78 which is secured to the flexible diaphragm 76 is annular so that a small deflection of the diaphragm towards the nozzle 82 will bring this into contact with the flexible material of the diaphragm.

It will be understood that when a transmitter of the above described form is used, the vessel 9 will not be provided with a valve 5a as previously described by reference to Figure 2 of the drawings.

The transmitter functions as follows. A small flow of air from a substantially constant pressure supply of compressed air is maintained through the space between the flexible diaphragm 76 and the recessed disc 74 by way of pipe 81, the throttling capillary 80, the nozzle 82, and the pipe 83 which is open to the atmosphere. This deflects the diaphragm 76 away from the nozzle 82, but the opposing pressure communicated from the vapour in the closed vessel 9 through the passage 73 tends to prevent it so that the diaphragm 76 takes up such a position that the flow of air through the nozzle 82 is just sufficient to balance the pressures. By opening valve 5a the pressure in vessel 9 is transmitted to a recorder by means of pipe 27. It has been found in practice that such a pressure transmitter works satisfactorily with an error of only a small fraction of 1% over a range of pressure from 1/2 to 15 pounds per square inch.

Referring to Figure 6 of the drawings in which parts corresponding to similar parts in Figure 5 are indicated by the same numerals, the body of the combined diaphragm-type pump and pressure transmitter illustrated therein in vertical cross-section is essentially similar to that for the diaphragm-type pump 10 already described by reference to Figure 2 of the drawings, except that the upper concave part of the body is arranged so that the compressed air inlet 14 above the diaphragm 76 terminates in a nozzle 82, and is provided with a second compressed air inlet 81 and a throttling capillary 80. It is also provided with and drilled for inlet and outlet ports of a modified form (85) of the preferred type of diaphragm valve as described by reference to Figure 1. The flexible diaphragm 76 corresponds to that of the transmitter of Figure 5 and also to that of the pump 10 described by reference to Figure 2 of the drawing. The discs 77 and 78 are secured to the flexible diaphragm 76 by the rivets 79 to stiffen it and to ensure that a sufficiently large area of the diaphragm is subjected to the balancing pressure imposed by the small flow of air through the throttling capillary 80 and the nozzle 82 and thus to ensure accuracy of the pressure transmitted.

The valve 85 serves the purpose of the simple valve 5a of Figures 2 and 5; the latter not being suitable in this instance as the pressure above the diaphragm 76, when this is being actuated by alternate application and release of air pressure via the pipe 14, may rise to that of the air pressure used to maintain the valve in the closed position. Valve 85 is therefore arranged to be operated by the button 84 which is covered by a flexible diaphragm 86 above which the air pressure is applied via pipe 15. The space between the diaphragm of valve 85 and the diaphragm 86 is vented to atmosphere by the hole 87. The button 84 has a small protruding spherical surface on the centre of its face adjacent to the diaphragm of valve 85 so that the closing force exerted by the air pressure on diaphragm 86 is applied to a smaller area of the diaphragm of valve 85 over its inlet port and therefore ensures that the valve will remain closed, when desired, against the pressure in the pump above diaphragm 76.

It will be understood that the diaphragm 76 may be pressed upwards into contact with the nozzle 82 with sufficient force to cause injury to the diaphragm at the contact area. In order to avoid this the heads of the rivets 79 are adjusted in height so as to come into contact with the upper inside surface of the pump body as soon as the diaphragm 76 has risen sufficiently to close the nozzle completely.

The combined diaphragm-type pumps and pressure transmitter is arranged to function as described in what follows.

The pipe 81 is directly connected to the compressed air supply and the pipe 14 is connected to the same supply and to atmosphere through a relay valve 4 (not shown) of the type described with reference to Figure 2 of the drawings. The pipe 15 is also connected to the compressed air supply through a relay valve 5 (not shown), and pipe 27 is connected to a conventional pressure recorder. With the valve 85 closed by pressure on diaphragm 86 from the compressed air pipe 15, the opening of the relay valve 4 to atmosphere will cause the vapour pressure in the closed vessel 9 to raise the diaphragm 76. Subsequent alternate operation of relay valve 4 to apply pressure to, and to release pressure from, the diaphragm 76 will cause vapour to bubble through the liquid in the vessel 9 and so evaporate it. The small flow of air from the throttling capillary 80 is insufficient to interfere with this operation. When this bubbling agitation has proceeded for the desired period the relay valve 4 is opened to atmosphere and the diaphragm 76 rises until it approaches the nozzle 82 and takes up a position such that the pressure due to the small flow of air through the throttling capillary 80 and the nozzle 82 balances the vapour pressure in the vessel under the diaphragm 76. The valve 85 is then opened by releasing the compressed air pressure in pipe 15 through relay valve 5 and the pressure is transmitted to the recorder via pipe 27.

It will be understood that when a combined diaphragm-type pump and pressure transmitter of the above described form is used instead of the pump 10 described by reference to Figure 2 of the drawings, the vessel 9 will not be provided with a valve 5a as described by reference to Figure 2 of the drawings, nor with a connection for a pressure transmitter as described by reference to Figure 5 of the drawings.

I claim:

1. Apparatus for automatically taking, at predetermined intervals, samples of volatile liquid and recording its vapor pressure at a desired temperature comprising: a closed vessel; means for taking the desired quantity of liquid from a supply and transferring it to the closed vessel; means for agitating the liquid in the vessel to insure maximum vaporization thereof; means for heating the vessel and its contents to, and for maintaining them at a substantially constant temperature; means for transmitting the vapor pressure to a pressure recorder; means for rejecting the vapor and excess liquid after the vapor pressure has been recorded, and for purging the vessel; means for controlling said means for taking the desired quantity of liquid and transferring it to the vessel, said means for agitating the liquid in the vessel, said means for transmitting the vapor pressure to the recorder, and said means for rejecting the vapor and excess liquid, and for purging the vessel; and a timing mechanism for operating said control means at predetermined intervals, said timing mechanism comprising in combination a camshaft having cams in number appropriate to the number of control means to be operated, a power shaft parallel to said camshaft and adapted to drive said camshaft through suitable gearing and having mounted thereon by eccentric sheave one thrust fork for each cam of the camshaft, a fixed shaft having rotatably mounted thereon one rocker arm for each cam of the camshaft and adapted to govern the direction of thrust of the associated thrust fork and a second fixed shaft having rotatably mounted thereon one double arm for each of the cams of the camshaft and adapted to be turned by the associated thrust fork, said double arms having bars which are adapted to operate the devices controlling the various means, the profiles of said cams and their arrangement on said camshaft be adapted to give the desired sequence of operations.

2. Apparatus as claimed in claim 1 in which the bar with which each double arm of the timing mechanism is provided is in the form of a flat spring constrained to the form of a slightly curved strut.

3. Apparatus as claimed in claim 1 in which the camshaft of the timing mechanism is driven through a ratchet wheel thereon which is actuated by a pawl mounted by eccentric sheave on the power shaft.

4. Apparatus as claimed in claim 1 in which the timing mechanism is provided with an additional driven shaft carrying a wheel which is notched in its circumference and the camshaft is provided with an arm rotatably mounted to ride freely thereon, said arm carrying a rod which is arranged parallel to the camshaft and is supported towards one end on the circumference of the notched wheel, the ratchet wheel on the camshaft being provided with deepened teeth at intervals and the pawl which actuates the ratchet wheel being slotted to receive and to slide on the other end of the rod carried by the arm rotatably mounted on the camshaft.

5. Apparatus as claimed in claim 4 in which the additional driven shaft of the timing mechanism is provided with an eccentric rod adapted to operate a device for controlling the taking of samples of liquid from two supplies alternately.

6. Apparatus as claimed in claim 5 in which the timing mechanism is provided with a toothed wheel on the additional driven shaft, and with a spindle having a gear wheel integral therewith at one end and a knob at the other, said spindle being arranged with the knob outside an enclosure for the timing mechanism and the gear wheel inside, and said toothed wheel having teeth removed from portions of its circumference and being arranged on the additional driven shaft in such relationship to the notched wheel thereon that it is engaged by the gear wheel of said spindle when the knob of the spindle is pushed in and turned during the period between the ending of an automatic cycle and the beginning of another but not during an automatic cycle.

7. Apparatus as claimed in claim 4 in which the timing mechanism is provided with a toothed wheel on the additional driven shaft, and with a spindle having a gear wheel integral therewith at one end and a knob at the other, said spindle being arranged with the knob outside an enclosure for the timing mechanism and the gear wheel inside, and said toothed wheel having teeth removed from portions of its circumference and being arranged on the additional driven shaft in such relationship to the notched wheel thereon that it is engaged by the gear wheel of said spindle when the knob of the spindle is pushed in and turned during the period between the ending of an automatic cycle and the beginning of another but not during an automatic cycle.

8. Apparatus for automatically taking, at predetermined intervals, samples of volatile liquid and recording its vapor pressure at a desired temperature comprising: a closed vessel; means for taking the desired quantity of liquid from a supply and transferring it to the closed vessel; means for agitating the liquid in the vessel to insure maximum vaporization thereof; means for heating the vessel and its contents to, and for maintaining them at a substantially constant temperature; means for transmitting the vapor pressure to a pressure recorder; means for rejecting the vapor and excess liquid after the vapor pressure has been recorded, for purging the vessel, and for providing for the presence therein of an atmosphere of indifferent gas before the taking of the next sample of volatile liquid; means for controlling said means for taking the desired quantity of liquid and transferring it to the vessel, said means for agitating the liquid in the vessel, said means for transmitting the vapor pressure to the recorder, and said means for rejecting the vapor and excess liquid, for purging the vessel and for providing for the presence of an atmosphere of indifferent gas; and means for operating said control means at predetermined intervals; said closed vessel having two intercommunicating chambers of different size, the larger chamber having a volume equal to that at atmospheric pressure of the indifferent gas required to be present, a displaceable element in the smaller chamber for isolating it from the larger chamber while the latter is being filled with indifferent gas, the total volume displacement of said displaceable element being arranged substantially equal to that of the desired quantity of liquid to be transferred from the supply into the closed vessel.

9. Apparatus as claimed in claim 8 wherein said chambers are intercommunicated by ports formed in said closed vessel therebetween and wherein said agitating means comprises a tube extending through one of said ports and having its ends communicating respectively with each of said chambers, and non-return valves disposed in the other of said ports.

10. Apparatus as claimed in claim 8 wherein said displaceable element comprises a flexible diaphragm operated by compressed air applied between its outer side and said vessel.

11. Apparatus as claimed in claim 10 wherein said means for transmitting the vapor pressure to a pressure recorder is connected with the outer side of said diaphragm and comprises a throttling capillary for introducing a second air supply to the outer side of said diaphragm and an air-operated valve arranged to control the communication of the pressure recorder with the outer side of said diaphragm.

References Cited in the file of this patent

UNITED STATES PATENTS

| | | |
|---|---|---|
| 2,119,786 | Kallam | June 17, 1938 |
| 2,315,223 | Riche | Mar. 30, 1943 |
| 2,540,377 | Pachaly | Feb. 6, 1951 |